United States Patent [19]

Kuszewski et al.

[11] 3,821,223
[45] June 28, 1974

[54] 5-CHLORO-6-METHYL-3-NEOPENTYLURACIL

[75] Inventors: James R. Kuszewski, East Longmeadow, Mass.; Raymond W. Luckenbaugh; Winston J. Wayne, both of Wilmington, Del.

[73] Assignee: E. I. du Pont de Nemours and Company, Wilmington, Del.

[22] Filed: July 14, 1971

[21] Appl. No.: 162,653

[52] U.S. Cl.................................. 260/260, 71/92
[51] Int. Cl......................................... C07d 51/30
[58] Field of Search................................. 260/260

[56]    References Cited
UNITED STATES PATENTS

| | | | |
|---|---|---|---|
| 3,227,541 | 1/1966 | Crawford | 260/260 |
| 3,235,360 | 2/1966 | Soboczenski | 260/260 |
| 3,300,292 | 1/1967 | Luckenbaugh | 260/260 |
| 3,352,862 | 11/1967 | Loux | 260/260 |

FOREIGN PATENTS OR APPLICATIONS

| | | | |
|---|---|---|---|
| 106,253 | 1/1967 | Denmark | 260/260 |

*Primary Examiner*—Donald G. Daus
*Assistant Examiner*—Anne Marie T. Tighe

[57]    ABSTRACT

The compound 5-chloro-6-methyl-3-neopentyluracil selectively controls many weeds in corn and soybeans.

1 Claim, No Drawings

5-CHLORO-6-METHYL-3-NEOPENTYLURACIL

BACKGROUND OF THE INVENTION

U.S. Pat. Nos. 3,235,357 and 3,352,862 disclose that a large class of uracils have herbicidal activity. Several of the uracils disclosed in that patent have found commercial utility as total herbicides.

However, an important area for herbicides is in the selective control of weeds in various crops. A herbicide that can control weeds in corn and soybeans without injuring the crop is particularly desirable.

SUMMARY OF THE INVENTION

We have found that the compound 5-chloro-6-methyl-3-neopentyluracil selectively controls many weeds in field corn, sweet corn and soybeans.

DESCRIPTION OF THE INVENTION

The compound 5-chloro-6-methyl-3-neopentyluracil has the following structure:

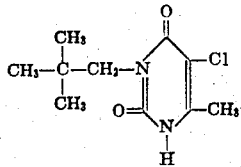

The compound can be made in the following manner.

EXAMPLE 1

To a reaction vessel charged with neopentylamine, 259 parts; concentrated hydrochloric acid, 207 parts; and crushed ice, 1800 parts; is added portionwise and with stirring over 0.5 hour, 265 parts potassium cyanate. The mixture is heated at 70°C for 2.5 hours and then cooled to 0°C. The white, crystalline solid, neopentylurea, is filtered and vacuum dried. It shows a melting point of about 151°–153°C.

This material, 311 parts; ethyl acetoacetate, 344 parts; p-toluenesulfonic acid, 14 parts; and benzene, 2500 parts; are charged into a reaction vessel equipped with a stirrer and a reflux condenser. A Dean-Stark trap separates water formed from the condensed vapors. The mixture is refluxed until water evolution essentially ceases, about 12–18 hours. The mixture is cooled and a solution of 156 parts sodium methoxide in 700 parts ethanol is added. The reaction mixture is again refluxed for 3.5 hours, and then poured into 1800 parts crushed ice. The organic layer is separated and washed twice with 200 parts water. The water wash is combined with the aqueous layer and washed three times with 600 parts methylene chloride, the methylene chloride layer being discarded. After filtration, the aqueous fraction is acidified to a pH of 3 with hydrochloric acid. The precipitated solid, 6-methyl-3-neopentyluracil, is collected by filtration and air-dried. After recrystallization from acetonitrile, it shows a melting point of about 182°–183.5°C.

This material, 145 parts, is dissolved in 2000 parts methylene chloride, and with efficient stirring, a mixture of 100 parts sulfuryl chloride and 520 parts methylene chloride is gradually added. After the addition is complete, the reaction mixture is refluxed for 1 hour, and then cooled to 0°C. The precipitated 5-chloro-6-methyl-3-neopentyluracil is collected by filtration, washed with hexane, and air-dried. Without further recrystallization it shows a melting point of 244.5°–246°C.

Utility

The compound disclosed in this invention when applied at rates ranging from ¼ to 4 kilograms per hectare, selectively controls many weeds in field corn, sweet corn, and soybeans. The rate of application to the locus of the crops depends upon many factors such as soil type, method of application, etc. The compounds can be applied pre-emergence or as a directed post-emergence spray treatment. It should be applied as uniformly as possible and thorough coverage of the weeds is essential in post-emergence applications.

Proper application of this compound results in good control of many serious and troublesome weeds. Some of the many different weed species controlled are yellow rocket (*Barbaria vulgaris*), common ragweed (*Ambrosia artemisifolia*), common crabgrass (*Digitaria sanguinalis*), teaweed (*Sidia spinosa*), giant foxtail (*Setaria faberii*), pigweed (*Amaranthus sp.*), witchgrass (*Panucum capillare*), field paspalum (*Paspalum laeve*), morningglory (*Ipomoea sp.*), lambsquarter (*Chenapodium alba*), smartweed (*Polygonum sp.*), goosegrass (*Eleusine indica*), curly dock (*Rumex crispus*), Johnsongrass (*Sorghum halepense*), velvetleaf (*Abutilon Thiophrasti*), perennial ryegrass (*Lobium perenne*), fall panicum (*Panicum dichotomiflorum*), yellow foxtail (*Setaria glauca*), purslane (*Portulaca aleracea*), barnyardgrass (*Echinochloa crusgalli*), dallisgrass (*Paspalum dilitatum*), green foxtail (*Setaria viridis*), chickweed (*Stellaria media*), ragweed (*Ambrosia trifidia*), purple lovegrass (*Eragrostis spectabilis*), smooth crabgrass (*Digitaria ischaemum*) and corn cockle (*Agrostemma githago*). Of particular interest is the high activity of the compound of the invention on pigweed.

Compositions

The uracil of this invention can be prepared for use by incorporating it with adjuvants such as inert solid diluents, liquid carriers and surfactants.

The amount of herbicide in such preparations can vary over a wide range according to need. Such amounts will be called a herbicidally effective amount. Generally speaking, they will contain from about 0.5 to 95%, by weight of the uracil.

Powdered or dust compositions of the invention, whether or not also modified with a surface-active agent, are prepared by mixing the active ingredient with finely divided inert solid carriers. Such carriers are talcs, natural clays, pyrophyllite, diatomaceous earth, and flours such as walnut shell, wheat, redwood, soya bean, and cottonseed. Other inert solid carriers which can be used include magnesium and calcium carbonates, calcium phosphates, sulfur, lime, etc., either in powder or granular form. The preferred diluents are attapulgite clay, montmorillonite clay, kaolinites and synthetic silicas and silicates.

Wettable powders are compositions which usually contain inert solid diluents in addition to surfactants. These inert diluents may serve several purposes. They can act as grinding aids to prevent mill smear and screen blinding; they can aid rapid dispersion of the mix when placed in water; they can adsorb liquid or low melting solid active material to produce a free flowing solid product; they can prevent agglomeration into lumps upon prolonged hot storage and they can permit preparation of compositions with a controlled amount of active ingredient so that proper dosage is easily measured by the consumer.

Wettable powders will normally contain both a wetter and a dispersant. Most preferred for dry wettable powders are those anionic and nonionic surfactants which exist in solid form. Occasionally a liquid, non-ionic surfactant, normally considered an emulsifying agent, can be used to produce both wetting and dispersion.

Wetting and dispersing agents in wettable powders of this invention, when taken together, will comprise from about 0.5 weight percent to 5.0 weight percent of the total composition. The active component will be present at a concentration of from about 20 to 90% and diluent makes up the balance to 100%. Where needed a corrosion inhibitor or foaming inhibitor may be added at rates of 0.1% to 1.0% with a corresponding reduction in diluent.

Dust compositions are those intended for application in dry form with suitable dusting equipment. Since wind drift is undesirable when applying dusts, the most suitable dust diluents are those which are dense and rapid settling. These include kaolinites, talcs, pyrophyllites, ground phosphate rock, sericite, and ground tobacco stems. However, dusts can be easily prepared by diluting an existing high-strength wettable powder with a dense diluent, so that the final dust will frequently contain a fraction of light, absorptive diluent as well as the more desirable dense filler.

A wetting agent may be desirable in dust formulations so that adhesion to dew-covered foliage is enhanced. Dusts made from wettable powders will usually contain sufficient wetter, but dusts made directly from unformulated active would require an added wetting agent. Dry solid anionic or nonionic wetters are preferred.

Dust formulations will normally contain from 0.5 weight percent to 25 weight percent of active material; however, dust concentrates containing 50 to 95 percent of active material are useful. These preparations are made by thoroughly blending the active ingredient with the other ingredients and grinding the mixtures. The particles in such preparations are preferably less than 50 microns in average diameter.

The term "surfactant or surface-active agent" is intended to include wetting agents, dispersing agents, suspending agents and emulsifying agents. Surface-active agents suitable for use are set forth in "Detergents and Emulsifiers 1970 Annual", John W. McCutcheon, Inc., Morristown, New Jersey. The preferred surfactants include sodium alkylnaphthalenesulfonates, sodium alkylbenzenesulfonates, dioctyl sodium sulfosuccinate and sodium laurylsulfate.

Granule or pellet compositions can be prepared by mixing the active material in finely divided form with clays (with or without water soluble binders), moistening the mixture with 15–20% water, extruding the mass under pressure through an orifice, then cutting the extrusions to size before drying to yield pellets or first drying, then granulating to yield granules. Similarly, the finely divided pre-mix can be granulated by tumbling, as on a granulating wheel, while applying water or a binder solution. Alternatively, granules, but usually not pellets, can be made by spraying active material in solution or suspension upon the surface of a preformed granule of clay, vermiculite, or other suitable granular material. When the active material is soluble in the spray medium so it can penetrate into the pores of the granular carrier no binding agent is needed. When it is insoluble and suspended, a binder is needed to adhere the active material to the surface. The binder can be soluble, such as crude lignin sulfonate or dextrin, or can be colloidally soluble such as swollen starch, glue or polyvinyl alcohol. The final step in either case is to remove the liquid medium, whether solvent or carrier. The percentage of the active ingredient may vary from 1–80% but is usually 3–25% of the herbicidal composition.

Liquid herbicidal compositions of this invention can be prepared by dispersing the active ingredient in an aqueous or inert non-aqueous carrier or by dissolving it in a suitable solvent. Suitable solvents are non-water-miscible ethers, esters, ketones and the like. Among non-solvent carriers aliphatic hydrocarbons and hydrocarbons of petroleum origin are preferred; these, as well as the aqueous dispersions, are prepared by milling the uracils with dispersing agents and suspending agents and inert carriers in mills such as pebble or sand mills. The amount of the herbicide in the dispersion may be from 10% or less to 50% of the aqueous or oil dispersion.

The particles in such dispersions may range from about 0.1 to 50 microns although the majority are preferably in the range of from about 0.5–5 microns in average diameters. In general, the oils used are aliphatic hydrocarbons and mixtures thereof, particularly those derived from petroleum and having a boiling point in the range from about 125° to 400°C. A hydrocarbon oil having a lower boiling point is less desirable because when sprayed from a nozzle, such a hydrocarbon tends to volatilize undesirably. Furthermore, low-boiling hydrocarbons present a serious fire hazard. Such compositions may be converted into emulsifiable oils by addition of a surfactant. Suitable surfactants are those anionic or nonionic agents known to the art as emulsifying agents. Emuslifying agents most suitable for the compositions of this invention are alkyl and alkylaryl polyethoxy alcohols, polyoxyethylene sorbitol or sorbitan fatty acid esters, polyethylene glycol fatty esters, fatty alkylol amide condensates, amine salts of fatty alcohol sulfates plus long chain alcohols, and oil soluble petroleum sulfonates. Such emulsifying agents will comprise from about 2–10 weight percent of the total composition.

While conventional applications of sprayable formulations have usually been made in a dilute form (for example at a rate of about 200 liters addition to hectare or more), the compounds of this invention can also be applied at higher concentrations in the typical "ultra-low-volume" or "low-volume" applications from aircraft or ground sprayers. For this purpose wettable powders can be dispersed in small amounts of aqueous or non-aqueous carrier. The solutions, suspensions and emulsifiable concentrates can be used directly or with minor dilution. Special compositions particularly suitable for ULV applications are solutions or finely divided suspensions in one or more carrier such as dialkylformamides, N-alkylpyrrolidones, dimethylsulfoxide, water, esters, ketones, glycols, glycol ethers and the like. Other suitable carriers include aromatic hydrocarbons (halogenated and non-halogenated), aliphatic hydrocarbons (halogenated and non-halogenated) and the like.

The compositions of the invention can also optionally contain adhesives such as gelatin, blood albumin and such resins as rosin alkyd resins. These increase retention and tenacity of deposits following application.

The salts of the uracil of the invention are especially advantageous for use as herbicides because they are soluble in water and can be applied as aqueous solutions.

Such water-soluble preparations can be prepared by mixing the uracil with an alkaline solubilizing agent. Bases having a pH of at least 10.5 in a 1% aqueous solution, such as lithium, sodium or potassium phosphates, silicates, borates, oxides or hydroxides, are suitable. The preparations can contain from 0.5 to 80% active ingredient and from 5 to 99.5% of the solubilizing agent. The formulations of these salts may also be prepared in the form of solids or solutions of the salts in alcohol, etc.

It has also been found that preparation with polar low-molecular weight amines, such as ethanolamines, propanolamines and butanolamines gives addition compounds of the uracil soluble in water, especially when the amine is present in excess. Other amines, such as piperidine and octanolamines give addition compounds which are soluble in both water (with an excess of amine present) and hydrocarbon solvents. At the other end of the scale, amines such as dodecylamines, cocoamines and tallowamines give the addition compounds high hydrocarbon solubility.

Thus, it is apparent that by properly selecting an amine and forming an addition compound with it, this can be formulated as an aqueous solution, wettable powder, or as an oil-emulsifiable or oil-extendable formulation. In this way, the nitrogenous base-addition compounds give formulation and application advantages, while still maintaining the desirable herbicidal characteristics of the parent uracil.

The herbicidal compositions of this invention can be formulated to contain other uracil herbicides. They can also be formulated to contain other known herbicides in addition to the uracil to give compositions which have advantages over the individual components.

Among the known herbicides which can be combined with the uracil of the invention are:

|  | Ratio of other herbicide to 5-Chloro-6-methyl-3-neopentyluracil |
| --- | --- |
| alachlor | 1:5 to 10:1 |
| atrazine | 1:10 to 10:1 |
| linuron | 1:10 to 10:1 |
| propachlor | 1:5 to 20:1 |
| amiben | 1:5 to 10:1 |

The compound of the invention may be formulated and applied in the following ways.

Wettable Powders

EXAMPLE 2

|  | Percent |
| --- | --- |
| 5-Chloro-6-methyl-3-neopentyluracil | 80.0 |
| Sodium lauryl sulfate | 0.6 |
| Sodium lignin sulfonate | 2.0 |
| Kaolin clay | 17.4 |

These components are blended and hammer-milled until the solids are substantially all below 50 microns in particle size. The mixture is then reblended until it is homogeneous.

One kilogram of the above material can be mixed with 560 liters of water and the mixture applied pre-emergence to a hectare of soybeans to control the weeds in the soybeans.

EXAMPLE 3

|  | Percent |
| --- | --- |
| 5-Chloro-6-methyl-3-neopentyluracil | 80.0 |
| Dioctyl sodium sulfosuccinate concreted with sodium benzoate (Aerosol OTB) | 2.5 |
| Partially desulfonated sodium lignin sulfonate (Marasperse CB) | 1.5 |
| Alkylnaphthalene sulfonate ("Alkanol B") | 3.0 |
| Basic magnesium carbonate | 2.0 |
| Attapulgite | 9.0 |
| Fine silica | 2.0 |

This powder is prepared as in Example 2.

Two kilograms of the above wettable powder formulation can be suspended in 400 liters of water and applied as a directed spray treatment to a hectare of sweet corn. The corn plants should be at least 15 cm tall or taller, and care should be taken not to wet the corn foliage. Thorough coverage of the weed foliage is essential. This treatment will provide good control of troublesome weed present in the corn.

The above formulation can also be used to control weeds in soybeans.

EXAMPLE 4

A wettable powder can be prepared by blending the following components in a ribbon blender, then hammer-milling them until substantially all the particles are below 50 microns in size, and then reblending until homogeneous.

|  | Percent |
| --- | --- |
| 5-Chloro-6-methyl-3-neopentyluracil | 25 |
| Kaolin clay | 70 |
| Dioctyl ester of sodium sulfosuccinic acid | 1 |
| Sodium lignin sulfonate | 4 |

This formulation can be applied pre-emergence at a rate of 2 kilograms per hectare to field corn. The formulation should be applied in enough water to insure adequate coverage.

EXAMPLE 5

|  | Percent |
| --- | --- |
| 5-Chloro-6-methyl-3-neopentyluracil | 50 |
| Kaolin clay | 48 |
| Dioctyl ester of sodium sulfosuccinic acid | 1 |
| Sodium lignin sulfonate | 1 |

These ingredients are mixed together in a ribbon blender, then hammer-milled and then ground in an air attrition mill until substantially all the particles are below 50 microns in size. The ground product is then remixed in a ribbon blender until homogeneous.

The above formulation can be mixed with water and applied pre-emergence at a rate of 3 kilograms per hectare to field corn.

EXAMPLE 6

| | Percent |
|---|---|
| 5-Chloro-6-methyl-3-neopentyluracil | 25 |
| 3-(3,4-dichlorophenyl)-1-methoxy-1-methyl-urea | 25 |
| Kaolin clay | 47.5 |
| Alkylnapthalenesulfonic acid, Na salt | 2.0 |
| Methyl cellulose, low viscosity | 0.5 |

The blended mixture is hammer-milled until all particles are substantially less than 50 microns in size and then reblended.

One and one-quarter kilograms of the above formulation can be mixed with 500 liters of water and applied as a directed post-emergence spray to a hectare of field corn. The foliage of the weeds are thoroughly covered with the spray. The treatment will provide full season control of many serious weed species.

Granules

EXAMPLE 7

| | Percent |
|---|---|
| 5-Chloro-6-methyl-3-neopentyluracil | 12 |
| Anhydrous sodium sulfate | 10 |
| Non-swelling sub-bentonite clay | 78 |

These components are blended and hammer-milled then moistened with water and granulated. The granules are then dried and screened.

The granules can be applied at the rate of 10 kilograms per hectare to field corn, with an applicator mounted behind the planter.

EXAMPLE 8

| | Percent |
|---|---|
| 5-Chloro-6-methyl-3-neopentyluracil | 4 |
| Anhydrous sodium sulfate | 16 |
| Non-swelling Ca, Mg bentonite | 79 |
| Alkyl naphthalene sulfonate, Na salt | 1 |

These components are formulated as 4 to 8 mesh (2.5 to 5 mm) granules by blending and grinding the components, then moist-granulating them, followed by drying and screening.

The above granules can be applied pre-emergence to sweet corn at a rate of 17.5 kilograms per hectare to control weeds.

EXAMPLE 9

| | Percent |
|---|---|
| 5-Chloro-6-methyl-3-neopentyluracil, Na salt | 2.5 |
| Granular 8–15 mesh (1.3 to 2.5 mm) attapulgite clay | 97.5 |

A granular composition is prepared by dissolving the active ingredient in warm water and spraying this solution on the attapulgite granules while they are tumbled. The resulting granules are then dried.

Twenty kilograms of the above granules can be applied preemergence to a hectare of corn to provide full season weed control.

EXAMPLE 10

| | Percent |
|---|---|
| 5-Chloro-6-methyl-3-neopentyluracil | 10 |
| Attapulgite clay | 88 |
| Alkyl naphthalene sulfonic acid, Na salt | 1 |
| Lignin sulfonic acid, Na salt | 1 |

These ingredients are mixed in a ribbon blender until homogeneous, ground and then charged to a pug mill, where sufficient water is blended in to form a thick paste. The paste is discharged from the pug mill in the form of extrusions which are dried and broken by a rotary crusher into irregular granules.

Seven kilograms of the above granules can be applied preemergence to a hectare of field corn. The granules should be distributed as uniformly as possible.

EXAMPLE 11

| | Percent |
|---|---|
| 5-Chloro-6-methyl-3-neopentyluracil | 5 |
| Attapulgite clay | 93 |
| Alkyl naphthalene sulfonic acid, Na salt | 1 |
| Lignin sulfonic acid, Na salt | 1 |

These ingredients are mixed in a ribbon blender until homogeneous, ground and then charged to a pug mill, where sufficient water is blended in to form a thick paste. The paste is discharged from the pug mill in the form of extrusions which are dried and broken by a rotary crusher into irregular granules.

The granules can be broadcast at a rate of 11 kilograms per hectare on sweet corn. When the granules are applied immediately after planting, they can provide full season control of weeds.

EXAMPLE 12

| | Percent |
|---|---|
| 5-Chloro-6-methyl-3-neopentyluracil | 2.5 |
| Anhydrous sodium sulfate | 15.0 |
| Sodium lignin sulfonate | 15.0 |
| Ca, Mg. bentonite | 67.5 |

These components are blended and hammer-milled then moistened with 18–20% water and extruded through die holes having a diameter of ⅛" (app. 3.2 mm). The extrusions are cut into pellets and then dried.

The above pellets can be applied postemergence to sweet corn and preemergence to the weeds at a rate of 20 kilograms per hectare.

EXAMPLE 13

| | Percent |
|---|---|
| 5-Chloro-6-methyl-3-neopentyluracil | 2.5 |
| Alkyl naphthalene sulfonic acid, Na salt | 1.0 |
| Anhydrous sodium sulfate | 15.0 |
| Non-swelling montmorillonoid type clay (Pikes Peak clay) | 81.5 |

These components are blended and hammer-milled then wetted with 18–25% water and extruded through a die. The extrusions are cut into ⅛ inch pellets (app. 3.2 mm) and then dried.

Fifteen kilograms of the pellets can be applied to a hectare of field corn planted. The treatment can be applied pre-emergence to both the corn and weeds. Good full season weed control will be provided and the corn produced in a good yield.

EXAMPLE 14

| | Percent |
|---|---|
| 5-Chloro-6-methyl-3-neopentyluracil | 90.0 |
| Alkylnapthalenesulfonate, Na salt | 2.0 |
| Low viscosity methyl cellulose | 0.3 |
| Attapulgite clay | 7.7 |

The components are blended and hammer-milled until the particles of the uracil have been reduced to about 10 microns in diameter, then reblended.

One kilogram of the wettable powder can be suspended in 400 liters of water and applied pre-emergence to field corn.

Soluble Powder

EXAMPLE 15

| | Percent |
|---|---|
| 5-Chloro-6-methyl-3-neopentyluracil | 52.5 |
| Sodium silicate | 28.5 |
| Potassium carbonate | 18.5 |
| Dioctyl sodium sulfosuccinate | 0.5 |

The ingredients are blended and ground to give a free flowing powder. When added to water, the powder produces an aqueous solution of the uracil.

The above formulation can be dissolved in water and applied pre-emergence at the rate of two kilograms per hectare to a field of corn.

Oil Formulations

EXAMPLE 16

| | Percent |
|---|---|
| 5-Chloro-6-methyl-3-neopentyluracil | 40 |
| Soya lecithin | 3 |
| Substantially aliphatic, low viscosity mineral oil, e.g., kerosene or diesel oil | 57 |

The oil suspension is prepared by pregrinding the active material and mixing it with the other components with agitation, or by blending all the components together, then pebble-milling or sand-milling them to reduce the particle size of the active component. The product is suitable for dilution with weed oils to form an oil spray.

The above formulation can be mixed with water and the mixture applied at a rate of 1½ kilograms per hectare to sweet corn. The treatment can be applied pre-emergence to both the corn and weeds.

Aqueous Suspension

EXAMPLE 17

A water suspension is prepared by grinding the following ingredients with water in a ball or roller mill:

| | Percent |
|---|---|
| 5-Chloro-6-methyl-3-neopentyluracil | 25 |
| Hydrated attapulgite | 2 |
| Lignin sulfonic acid, sodium salt | 5 |
| Water | 68 |

Grinding is continued until substantially all the particles in the suspension have been reduced to diameters of less than 5 microns.

The above formulation can be applied pre-emergence to field corn planted in Keyport silt loam soil at a rate of 2 kilograms per hectare.

Aqueous solution

EXAMPLE 18

| | Percent |
|---|---|
| Water | 25.5 |
| Lithium hydroxide, monohydrate | 4.0 |
| Ethylene glycol | 38.5 |
| Methanol | 3.0 |
| Ethanol (denatured with methanol) | 7.0 |
| 5-Chloro-6-methyl-3-neopentyluracil | 22.0 |

The ingredients are combined with stirring in the order indicated to give an aqueous solution.

One and one-half kilograms of the above aqueous solution can be uniformly distributed over a hectare of sweet corn planted in Sassafras sandy loam soil. The treatment is applied pre-emergence to both the corn and weeds.

We claim:
1. 5-Chloro-6-methyl-3-neopentyluracil.

* * * * *